United States Patent
Sommer

(10) Patent No.: US 7,734,250 B2
(45) Date of Patent: Jun. 8, 2010

(54) METHOD FOR OPERATING A RADIO COMMUNICATIONS SYSTEM WITH SUBSCRIBER STATIONS SERVING AS ROUTING NODES, A ROUTING METHOD AND A CORRESPONDING SUBSCRIBER STATION

(75) Inventor: Volker Sommer, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 724 days.

(21) Appl. No.: 11/630,153

(22) PCT Filed: Jun. 2, 2005

(86) PCT No.: PCT/EP2005/052537

§ 371 (c)(1),
(2), (4) Date: Dec. 20, 2006

(87) PCT Pub. No.: WO2006/000515

PCT Pub. Date: Jan. 5, 2006

(65) Prior Publication Data

US 2008/0032697 A1    Feb. 7, 2008

(30) Foreign Application Priority Data

Jun. 23, 2004    (DE) .................... 10 2004 030 292

(51) Int. Cl.
*H04Q 7/20*    (2006.01)
(52) U.S. Cl. .................. 455/11.1; 455/7; 455/426.1; 455/426.2; 455/445; 455/422.1; 370/315; 370/326; 370/343; 370/310; 370/312

(58) Field of Classification Search .............. 455/11.1, 455/7, 426.1, 426.2, 414.1–414.4, 403, 422.1, 455/466, 550.1, 500, 517, 445; 370/315, 370/326, 343, 310, 312, 329, 293, 406, 431, 370/432, 480, 485, 492
See application file for complete search history.

(56) References Cited

U.S. PATENT DOCUMENTS 7,224,936 B2 *    5/2007    Pearson .................... 455/11.1

(Continued)

FOREIGN PATENT DOCUMENTS

WO    WO 02/51038 A1    6/2002

(Continued)

OTHER PUBLICATIONS

Wei Hung-Yu et al.: Two-Hop-Relay Architecture For Next-Generation WWAN/WLAN Integration, IEEE Wireless Communications, IEEE Service Center, Piscataway, NJ, US, Bd. 11, No. 2, Apr. 2004, pp. 24-30, XP001196396, ISSN: 1070-9916.

(Continued)

*Primary Examiner*—Keith T Ferguson
(74) *Attorney, Agent, or Firm*—Staas & Halsey LLP

(57) ABSTRACT

The method for operating a radio communications system, which provides for the routing of data of connections via subscriber stations, which occasionally perform the function of routing nodes, provides that one of the subscriber stations indicates, to a routing unit of the radio communications system, its readiness to take on the function of a routing node.

19 Claims, 1 Drawing Sheet

U.S. PATENT DOCUMENTS

2006/0126524 A1* 6/2006 Tateson ............... 370/252

FOREIGN PATENT DOCUMENTS

| WO | WO 02/080405 A1 | 10/2002 |
|---|---|---|
| WO | WO 03/055246 A1 | 7/2003 |
| WO | WO 2004/029751 A2 | 4/2004 |
| WO | WO 2004/034642 A1 | 4/2004 |
| WO | WO 2004/080002 A1 | 9/2004 |
| WO | WO 2004/088935 A1 | 10/2004 |

OTHER PUBLICATIONS

Jung Houn Yap et al.: Position Assisted Relaying And Handover In Hybrid Ad Hoc WCDMA Cellular System, Personal, Indoor and Mobile Radio Communications, 2002, The 13$^{th}$ IEEE International Symposium on Sep. 15-18, 2002, Piscataway, NJ, US, IEEE, Bd. 5, Sep. 15, 2002, pp. 2194-2198, XP010614117, ISBN: 0-7803-7589-0.

Weifa Liang et al.: Maximizing Battery Life Routing In Wireless Ad Hoc Networks, Department of Computer Science, Proceedings of the 37$^{th}$ Hawaii international Conference on System Sciences, 2004.

Shashidhar Lakkavalli & Suresh Singh: Using Remaining Battery Lifetime Information And Relaying To Decrease Outage Probability Of A Mobile Terminal, Departmant of Computer Science, Portland State University, Portland, OR-97201, US.

* cited by examiner

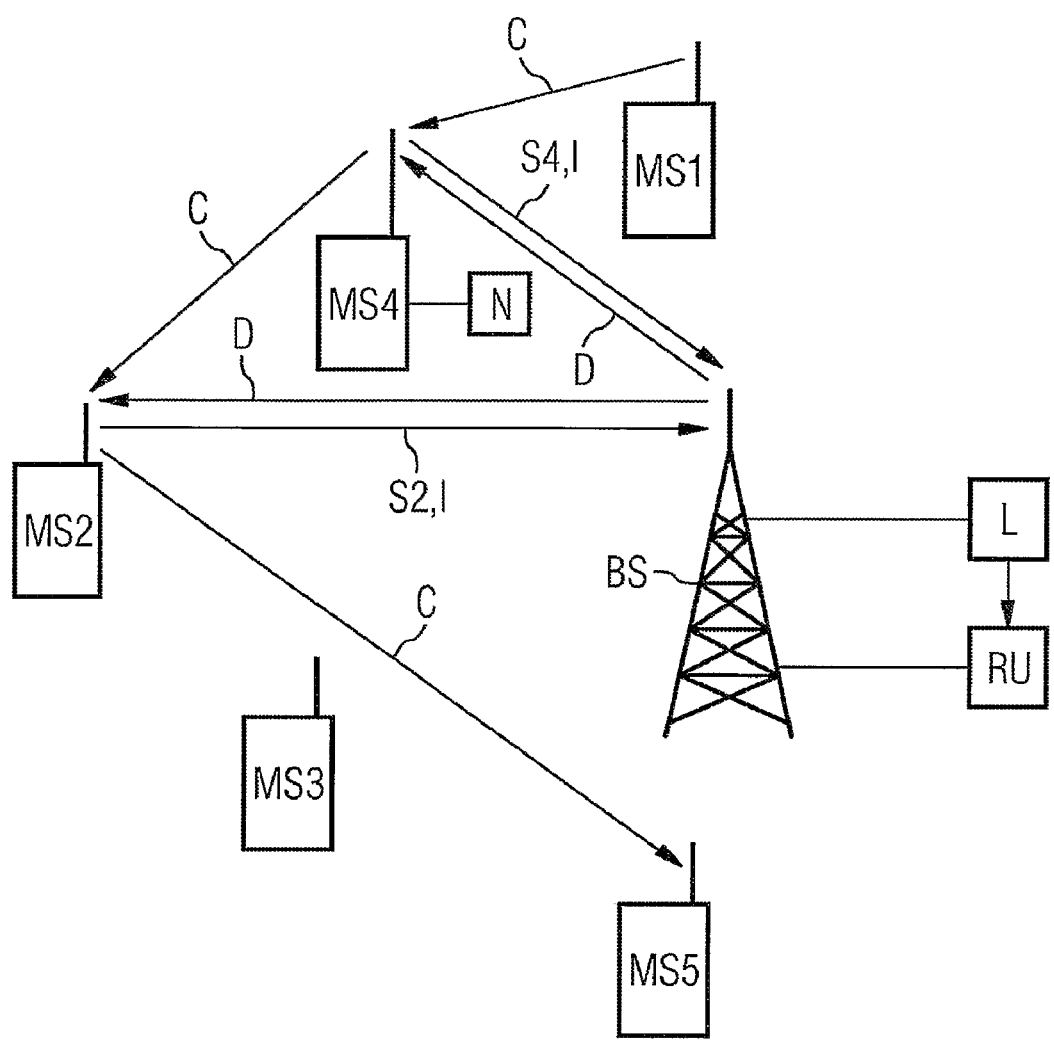

METHOD FOR OPERATING A RADIO COMMUNICATIONS SYSTEM WITH SUBSCRIBER STATIONS SERVING AS ROUTING NODES, A ROUTING METHOD AND A CORRESPONDING SUBSCRIBER STATION

CROSS REFERENCE TO RELATED APPLICATIONS

This application is based on and hereby claims priority to Application No. PCT/EP2005/052537 filed on Jun. 2, 2005 and German Application No. 10 2004 030 292.8 filed Jun. 23, 2004, the contents of which are hereby incorporated by reference.

BACKGROUND

The invention relates to a method for operating a radio communication system which makes provision for the relaying of data of connections via subscriber stations which temporarily fulfill the function of routing nodes. The invention further relates to a method for routing a connection in a radio communication system of said kind, as well as to a corresponding subscriber station and a corresponding routing unit.

Communication in radio communication systems is effected by electromagnetic waves over an air interface. One type of radio communication systems are the mobile radio systems. Known mobile radio systems of the so-called "second generation" are the US IS-95 standard and GSM (Global System of Mobile Communication). At the present time mobile radio systems of the third generation are in the process of being built, for example systems conforming to the FDD (Frequency Division Duplex) variant of the UMTS (Universal Mobile Telecommunication Standard) standard. The cited mobile radio systems are generally organized on a cellular basis, which is to say that they have a plurality of base stations, each of which provides coverage of a radio cell. The subscriber stations communicate with a base station located in the vicinity, in whose radio cell they find themselves.

Also known are what are referred to as wireless ad hoc networks in which signals of a connection are forwarded exclusively or partially via a plurality of subscriber stations acting as routing nodes. An ad hoc network of said type is described in L. Weifa et al: Maximizing Battery Life Routing in Wireless Ad Hoc Networks, IEEE Proceedings of the 37th Hawaii International Conference on System Sciences, 2004. Said paper describes a routing algorithm in which the battery power of the individual subscriber stations that may be suitable as routing nodes is taken into account. In particular said algorithm takes into account information relating to batteries with different charge capacity that are used in the subscriber stations.

In S. Lakkavalli et al: Using Remaining Battery Lifetime Information and Relaying to Decrease Outage Probability of a Mobile Terminal, published on the internet before the date of filing of the present application, there is a description of a cellular mobile radio network which likewise has an ad hoc component. Mobile subscriber stations transmit information relating to the charge condition of their battery to a base station. The base station is then able to calculate the maximum possible transmission power for the corresponding subscriber station. A distinction is made between routing nodes (relays) which have unlimited battery power because, for example, they are connected to the power supply of an automobile, and routing nodes with limited battery power.

WO 03/055246 A1 discloses a mobile communication network in which mobile stations having a relay function are used. In this arrangement a mobile communication network comprises mobile terminals including a fixed station for exchanging signals with a first mobile terminal. A second mobile terminal is configured in such a way as to exchange so-called relay signals between said fixed station and said first mobile terminal.

WO 02/51038 A1 discloses a billing method wherein mobile devices are used as relay equipment.

WO 02/080405 A1 discloses a communication relay device wherein the relay function is used only when there is a connection to an external power source.

WO 2004/034642 AI discloses a method for routing a connection from a first mobile station to a second mobile station, wherein a central routing unit receives positioning information and transmits routing information to the mobile stations.

SUMMARY

One possible object underlying the invention is to enable a favorable routing method to be performed in a radio communication system using subscriber stations as routing nodes.

The method for operating a radio communication system which makes provision for the relaying of data of connections via subscriber stations which temporarily perform the function of routing nodes provides that one of the subscriber stations signals its readiness to assume the function of a routing node to a routing unit of the radio communication system. The routing unit is then able to differentiate subscriber stations that want to be available as routing nodes from other subscriber stations. An advantage of the cited method is that it can be decided on the part of the subscriber station whether it is to be included in a routing operation by the routing unit or not.

The method therefore provides that among a plurality of active, that is to say operational, subscriber stations not necessarily all the subscriber stations will be available as routing nodes. Only those active subscriber stations that want to make themselves available for routing signal their readiness therefore in this manner.

According to a development the routing unit performs the routing of a connection by taking into consideration as routing nodes exclusively or preferably subscriber stations which have previously signaled their readiness to assume the function of a routing node.

It is of particular advantage if the mobile station, by its signaling, with which it indicates its readiness to assume the relaying function, simultaneously initiates a determination of the location of the mobile station. Results of such a location determination can then advantageously be used for the routing that is to be performed by the routing unit. In other words, the routing unit can then decide on the basis of the location information whether or not a routing via the corresponding routing node is useful for the connection to be routed in each case. The fact that the location determination is initiated simultaneously with the readiness signaling of the mobile station serves two purposes. Firstly, the location is determined only when the corresponding subscriber station communicates by way of its signaling that it is available as a routing node for the purpose of routing a connection. By proceeding this way, superfluous location determinations are avoided. Secondly, a result of the location determination is available as quickly as possible after the readiness signaling, so the subscriber station in question can also actually be taken into account by the routing unit for the routing of a connection.

According to a development the signaling by which the readiness to assume the function of a routing node is signaled is triggered as a function of an operating state of the subscriber station. This can happen for example automatically and independently of a user of the subscriber station in question. Advantageously the operating state of the subscriber station can be a charge condition of its power supply, a battery for example. The readiness to act as a routing node can, for example, be signaled only when the battery capacity exceeds a certain limit value, for example 50%.

Alternatively or in addition, the operating state of the subscriber station can also be the connection of a power supply of the subscriber station to a power network, by which the power supply can be replenished. By being connected to the power network the subscriber station is also assured of a reliable energy supply even when it consumes energy as a result of being available as a relay station for connections of other subscriber stations. In this case the power network can be, for example, a public power grid or a component part of a motor vehicle which is supplied with power by its car battery.

An embodiment can for example provide that the readiness signaling is initiated by the subscriber station only if its power supply is simultaneously connected to a power network and the charge condition of its power supply has exceeded a certain limit value. Then it is ensured on the one hand that the charge condition of the power supply of the subscriber station is not adversely affected as a result of its assuming its function as a relay station and that even after the severing of the connection to the power network replenishing the power supply a certain minimum charge condition of the subscriber-side power supply is present so that sufficient power is available for operation in conjunction with outgoing connections from the subscriber station or, as the case may be, connections directed to said subscriber station.

According to an alternative embodiment the signaling by which the readiness to assume the function of a routing node is signaled is initiated under the control of a user associated with the subscriber station. This means that the user of the subscriber station can determine whether the readiness signaling is effected or not. For this purpose corresponding input options can be provided for expressing the wishes of the user at the subscriber station such as, for example, a corresponding key. This can also be performed once again in combination with the previously described criteria in that, for example, the readiness is signaled only if the charge condition of the power supply has exceeded a certain threshold value and in addition the user of the subscriber station has indicated by a corresponding input at the subscriber station his/her agreement with the assumption of the relaying function.

It is favorable if the subscriber station also signals if it is no longer ready to assume the function of a routing node. This allows the subscriber station to be no longer taken into account for the further routing of a connection. It is then no longer made available as a routing node for new connections, for example. It can also be provided that the subscriber station in question is released, possibly after a certain delay period that is required in order to find an alternative route for the connection, from the relaying of signals of an existing connection for which it was previously defined as a routing node.

According to a development it is provided that the subscriber station, after location determination has been performed and after receipt of a corresponding request from the routing unit, sends to the routing unit further information which is useful for performing a routing operation. According to said development it is possible that initially the subscriber station only signals its readiness to assume the relaying function and initiates its location determination, while further information required or useful for the routing is transmitted only when it has been decided by the routing unit on the basis of said previously transmitted information to use said subscriber station as a routing node for a specific connection.

The method for routing a connection provides that a routing unit of the radio communication system receives, from at least one of the subscriber stations, signaling by which said subscriber station indicates its readiness to assume the function of routing node and the routing unit performs a routing of a connection, taking into account as routing nodes exclusively or preferably subscriber stations that have previously indicated their readiness to assume the function of a routing node.

The subscriber station and the routing unit are embodied in such a way and have mechanisms that they are able to support or, as the case may be, perform the methods and their embodiments and developments.

BRIEF DESCRIPTION OF THE DRAWINGS

The method, subscriber station and routing unit are explained in more detail below with reference to an exemplary embodiment shown in the FIGURE. The FIGURE shows the section of a cellular mobile radio system in which the subscriber stations not only are able to communicate directly with base stations of the mobile radio system, but in which—as in the case of an ad hoc network—it is also possible to relay signals of a connection via adjacent subscriber stations acting as routing nodes. However, the method can also be used in mobile radio communication systems which do not have a cellular structure but nonetheless have corresponding subscriber stations with relaying function. The FIGURE depicts only one base station BS of the mobile radio system, which base station BS is connected to a routing unit RU. In this case the routing unit RU can also be structurally integrated into the base station BS. It is also possible that the routing unit RU is connected to the base station BS via a base station controller. One routing unit RU can be provided per radio cell, or alternatively one routing unit RU can be provided for a plurality of radio cells. The routing unit RU is used for the purpose of performing routing of connections within the mobile radio system.

The FIGURE also shows five mobile subscriber stations MS1 to MS5 which are disposed within the radio cell of the base station BS. In this exemplary embodiment a connection C is to be set up between the first subscriber station MS1 and the fifth subscriber station MS5. This is to be accomplished exclusively through use of other subscriber stations as routing nodes and not by transmission of signals of the connection C via the base station BS. The second subscriber station MS2 is to be located in an automobile and connected to the power network or, as the case may be, onboard electrical system of the automobile. As soon as the charge condition of the battery of the second subscriber station MS2 exceeds a specific threshold value of, in this case, 50%, the second subscriber station MS2 notifies the routing unit RU via corresponding signaling S2 that it is available as a routing node.

DETAILED DESCRIPTION OF THE PREFERRED EMBODIMENT

Reference will now be made in detail to the preferred embodiments, examples of which are illustrated in the accompanying drawing, wherein like reference numerals refer to like elements throughout.

All signaling between the subscriber stations MS1 to MS5 of said radio cell and said routing unit RU is relayed via the base station BS.

The fourth subscriber station MS4 has an input option for a user N of said subscriber station by which the user can manually communicate to the routing unit his/her wish that the subscriber station MS4 shall act as a routing node. After a corresponding key has been pressed by the user N, corresponding signaling S4 is conveyed to the base station BS, which relays said signaling to the routing unit. Up to the time at which the connection C is to be set up between the first subscriber station MS1 and the fifth subscriber station MS5, only the third subscriber station MS3 has not signaled any readiness to be available as a routing node. This can be due, for example, to the fact that the charge condition of its battery has fallen below the limit value of 50%.

By the signaling S2, S4 of the second subscriber station MS2 and the fourth subscriber station MS4 it is also simultaneously signaled to the base station BS or, as the case may be, to the routing unit RU that a position finding or, as the case may be, location determination of said subscriber stations is to be performed. Appropriate methods for determining the location of mobile subscriber stations (for example, EO TDA=Enhanced Observed Time Differences of Arrival or A-GPS=Assisted Global Positioning System) are sufficiently known to the person skilled in the art and are not described any further here. The mobile radio system also has a localization unit L which is likewise connected to the base station BS and receives the signaling S2, S4 of the two subscriber stations MS2, MS4 and which recognizes on the basis of said signaling that a location determination is to be performed for the subscriber stations in question. The location determination is performed in one of the ways known to the person skilled in the art. The results of the location determination are subsequently made available to the routing unit RU by the localization unit L. The routing unit RU is now able to take into account, for the purpose of routing the connection C, all subscriber stations MS2, MS4 which have previously signaled, via corresponding signaling S2, S4, their readiness to assume a relaying function. For said routing the routing unit RU takes into account the previously determined location of the available routing nodes MS2, MS4 and establishes a route on the basis of a routing method known to the person skilled in the art. In this case criteria such as minimum number of routing nodes or minimization of the overall transmission power or minimization of the maximum transmission power per routing node can be taken into account.

It is beneficial, though not essential, that the routing unit RU requests, via a corresponding request D to those subscriber stations MS2, MS4 which are available as routing nodes, further information I that is accessible to said subscriber station MS2, MS4 for example on account of measurements that are to be performed. In this case the information can relate for example to distances from other subscriber stations. With the information I the subscriber stations MS2, MS4 can also transmit to the routing unit RU further details about their individual properties that are useful for the routing function. This can be, for example, the maximum data rate available for a relaying operation, the possible modulation types, or maximum or, as the case may be, minimum values for the transmission power.

In the present exemplary embodiment the routing unit RU determines a route for the connection C which goes from the first subscriber station MS1 via the fourth subscriber station MS4 and the second subscriber station MS2 to the fifth subscriber station MS5. The routing unit RU notifies this route to the subscriber stations involved, whereupon the corresponding connection C is set up.

If one of the subscriber stations acting as routing nodes for a connection wishes to cease exercising this function any further, it likewise communicates this to the routing unit RU via corresponding signaling S2, S4. If, for example, the charge condition of the power supply of the fourth subscriber station MS4 falls below the limit value of 50%, the routing unit RU is notified by corresponding signaling S4. The connection C is then re-routed by the routing unit RU, with only those subscriber stations being considered as routing nodes which have previously signaled their readiness to act as such and have not revoked such readiness. In the present case this is only the second subscriber station MS2.

With other exemplary embodiments it is also possible that the routing unit RU only preferably, rather than exclusively, determines those subscriber stations as routing nodes which have previously signaled their corresponding readiness. This means that initially as far as possible only those subscriber stations are factored in as routing nodes by the routing unit which have signaled their readiness therefor. However, if no favorable route for a connection can be determined by the routing unit in so far as it only includes routing nodes which have previously declared themselves ready for this, in the case of such exemplary embodiments the routing unit RU can also include one or more of the remaining subscriber stations (in the FIGURE this would be the third subscriber station MS3) in the routing scheme.

The routing unit RU is a network-side device of the mobile radio system which can perform the routing for a plurality of connections.

In the exemplary embodiment considered here, all the subscriber stations MS1 to MS5 are active before the start of the routing, that is to say they are switched on and therefore operational. Of these active subscriber stations, however, only the second and the fourth subscriber station MS2, MS4 signal their readiness to act as routing nodes.

In order to increase the incentive for users of the subscriber station to make their own subscriber station available as a routing node, a more favorable charging arrangement could be provided for said subscribers or the possibility could be provided that such users may upgrade their terminal device free of charge, as a result of which at the same time the latest technology would also always be available for the ad hoc component of the radio communication system. If the user, as in the case of the fourth subscriber station MS4, for example, has the possibility to inhibit or actively control the transmission of the signaling of the relaying readiness, he/she is able to prevent the corresponding location determination of his/her subscriber station MS4. His/her subscriber station is also available for setting up his/her own connections and radiation emissions are avoided in that the corresponding subscriber station MS4 does not act as a routing node.

The method enables centralized planning of optimal and reliable routing in ad hoc networks. The result is increased reliability and consequently greater acceptance of ad hoc networks than was previously the case.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for operating a radio communication system which makes provision for relaying data of connections via subscriber stations which temporarily act as routing nodes, comprising:
   signaling, from one of the subscriber stations signals to a routing unit of the radio communication system, that the subscriber station is ready to act as a routing node for a data connection; and
   wherein the routing unit sends a routing request to the subscriber station if the routing unit selects the subscriber station to act as a routing node, and
   after a location of a subscriber station has been determined and after the routing request has been received from the routing unit, the subscriber station sends to the routing unit further information for performing a routing operation.

2. The method as claimed in claim 1, wherein
   the routing unit routes the data connection by selecting subscriber stations which have previously signaled their readiness to act as a routing node, the subscriber stations being selected to serve as routing nodes.

3. The method as claimed in claim 2, wherein the routing unit selects only subscriber stations which have previously signaled their readiness to act as a routing node.

4. The method as claimed in claim 3, wherein
   the signaling which signals readiness to act as a routing node is triggered as a function of an operating state of the subscriber station.

5. The method as claimed in claim 4, wherein
   the operating state is a charge condition of a power supply of the subscriber station.

6. The method as claimed in claim 5, wherein
   the operating state is a connection of a power supply of the subscriber station to a power network by which power can be replenished.

7. The method as claimed in claim 6, wherein
   the subscriber station also signals when it is no longer ready to act as a routing node.

8. The method as claimed in claim 7, wherein the method further comprises:
   using the signals from the subscriber station to simultaneously initiate a determination of a location of the subscriber station.

9. The method as claimed in claim 3, wherein
   the signaling which signals readiness to act as a routing node is initiated under control of a user associated with the subscriber station.

10. The method as claimed in claim 9, wherein
    the subscriber station also signals when it is no longer ready to act as a routing node.

11. The method as claimed in claim 10, wherein the method further comprises:
    using the signals from the subscriber station to simultaneously initiate a determination of a location of the subscriber station.

12. The method as claimed in claim 1, wherein
    the signaling which signals readiness to act as a routing node is triggered as a function of an operating state of the subscriber station.

13. The method as claimed in claim 12, wherein
    the operating state is a charge condition of a power supply of the subscriber station.

14. The method as claimed in claim 12, wherein
    the operating state is a connection of a power supply of the subscriber station to a power network by which power can be replenished.

15. The method as claimed in claim 1, wherein
    the signaling which signals readiness to act as a routing node is initiated under control of a user associated with the subscriber station.

16. The method as claimed in claim 1, wherein
    the subscriber station also signals when it is no longer ready to act as a routing node.

17. The method as claimed in claim 1, wherein the method further comprises:
    using the signals from the subscriber station to simultaneously initiate a determination of a location of the subscriber station.

18. A subscriber station for a radio communication system which makes provision for relaying data of connections via subscriber stations which temporarily act as routing nodes, comprising:
    a signaling unit to signal readiness of the subscriber station to act as a routing node, the signaling unit signaling to a routing unit of the radio communication system, wherein
    the signaling unit is embodied to output signaling which simultaneously initiates a determination of a location of the subscriber station,
    the subscriber station receives from the routing unit a routing request if the routing unit selects the subscriber station to act as a routing node, and
    after the location of the subscriber station has been determined and after the routing request has been received from the routing unit, the subscriber station sends to the routing unit further information for performing a routing operation.

19. A routing unit for a radio communication system which makes provision for relaying data of connections via subscriber stations which temporarily act as routing nodes, comprising:
    a receiving device to receive, from at least one of the subscriber stations, signaling by which said subscriber station indicates readiness to act as a routing node for a data connection; and
    a routing device to route the data connection by selecting subscriber stations which (i) have previously indicated their readiness to act as a routing node and (ii) which have been located during a location determination, the subscriber stations being selected to serve as routing nodes
    wherein the receiving device receives further information from the subscriber station to enable the subscriber station to act as a routing node, the further information being received after the location determination and after the subscriber station has been selected to serve as a routing node.

* * * * *